(12) United States Patent
Turaga et al.

(10) Patent No.: US 8,494,036 B2
(45) Date of Patent: Jul. 23, 2013

(54) RESOURCE ADAPTIVE SPECTRUM ESTIMATION OF STREAMING DATA

(75) Inventors: Deepak Srinivac Turaga, Elmsford, NY (US); Michail Vlachos, Tarrytown, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1245 days.

(21) Appl. No.: 12/177,300

(22) Filed: Jul. 22, 2008

(65) Prior Publication Data

US 2009/0074043 A1    Mar. 19, 2009

Related U.S. Application Data

(63) Continuation of application No. 11/389,344, filed on Mar. 24, 2006, now Pat. No. 8,112,247.

(51) Int. Cl.
*H04B 3/46* (2006.01)

(52) U.S. Cl.
USPC ............................................................ 375/224

(58) Field of Classification Search
USPC .................................................. 375/224, 316
See application file for complete search history.

(56) References Cited

U.S. PATENT DOCUMENTS

| | | | |
|---|---|---|---|
| 5,463,775 A | 10/1995 | DeWitt et al. | |
| 5,781,861 A | 7/1998 | Kang et al. | |
| 5,943,170 A * | 8/1999 | Inbar et al. | 359/561 |
| 5,943,429 A * | 8/1999 | Handel | 381/94.2 |
| 6,009,129 A | 12/1999 | Kenney et al. | |
| 6,014,620 A | 1/2000 | Handel | |
| 6,400,310 B1 | 6/2002 | Byrnes et al. | |
| 6,594,524 B2 * | 7/2003 | Esteller et al. | 607/45 |
| 6,996,412 B2 * | 2/2006 | Hunzinger et al. | 455/510 |
| 7,817,717 B2 * | 10/2010 | Malayath et al. | 375/240.16 |
| 2002/0114383 A1 * | 8/2002 | Belge et al. | 375/222 |
| 2002/0140873 A1 * | 10/2002 | Van Dijk et al. | 348/797 |
| 2002/0194251 A1 * | 12/2002 | Richter et al. | 709/105 |
| 2003/0028582 A1 * | 2/2003 | Kosanovic | 709/105 |
| 2003/0163044 A1 * | 8/2003 | Heimdal et al. | 600/437 |

(Continued)

FOREIGN PATENT DOCUMENTS

| | | |
|---|---|---|
| CN | 1500260 | 5/2004 |
| WO | 03065351 | 7/2003 |

OTHER PUBLICATIONS

Kim: Won-Ik, et al., "A New Traffic-Load Shedding Scheme in the WCDMA Mobile Communication Systems", Proceedings of the Vehicular Technology Conference, 2002, pp. 2405-2409, IEEE, New York, New York, USA.

(Continued)

*Primary Examiner* — Jaison Joseph
(74) *Attorney, Agent, or Firm* — Ference & Associates LLC

(57) ABSTRACT

Streaming environments typically dictate incomplete or approximate algorithm execution, in order to cope with sudden surges in the data rate. Such limitations are even more accentuated in mobile environments (such as sensor networks) where computational and memory resources are typically limited. Introduced herein is a novel "resource adaptive" algorithm for spectrum and periodicity estimation on a continuous stream of data. The formulation is based on the derivation of a closed-form incremental computation of the spectrum, augmented by an intelligent load-shedding scheme that can adapt to available CPU resources. Experimentation indicates that the proposed technique can be a viable and resource efficient solution for real-time spectrum estimation.

20 Claims, 12 Drawing Sheets

U.S. PATENT DOCUMENTS

| | | | | |
|---|---|---|---|---|
| 2003/0214907 | A1* | 11/2003 | Berkcan et al. | 370/232 |
| 2003/0215867 | A1* | 11/2003 | Gulati | 435/6 |
| 2004/0137915 | A1 | 7/2004 | Diener et al. | |
| 2006/0075102 | A1* | 4/2006 | Cupit | 709/225 |
| 2007/0142873 | A1* | 6/2007 | Esteller et al. | 607/45 |

OTHER PUBLICATIONS

Broomhead, D., and, Lowe, D., Multivariate functional interpolation and adaptive networks. In Complex Systems, 2:321:355, 1988.

Castiglioni, P., De Rienzo, M., and Yosh, H., A Computationally Efficient Algorithm for Online Spectral Analysis of Beat-to-Beat Signals. In Computers in cardiology: 29, 417:420, 2002.

Cooley, J.W., and Tukey, J.W., An algorithm for the machine calculation of complex Fourier series. In Math. Comput. 19, 297:301, 1965.

De La Cuadra, P., Master, A., and Sapp, C., Efficient Pitch Detection Techniques for Interactive Music. In International Computer Music Conference, 2001.

Elfeky, M.G., Aref, W.G., and Elmagarmid, A.K., Using Convolution to Mine Obscure Periodic Patterns in One Pass. In EDBT, 2004.

Ergun, F., Muthukrishnam, S., and Sahinalp, S.C., Sublinear methods for detecting periodic trends in data streams. In LATIN, 2004.

Fan, W., SteamMiner: A Classifier Ensemble-based Engine to Mine Concept-drifting Data Streams. In Proc. of VLDB, pp. 1257-1260, 2004.

Gilbert, A.C., Guha, S., Indyk, P., Muthukrishnan, S., and Strauss, M., Near-optimal Sparse Fourier Representations via Sampling. In STOC, pp. 152-161, 2002.

Kontaki, M., and Papadopoulos, A., Efficient similarity search in streaming time sequences. In SSDBM, 2004.

Lazarescu, M., Venkatesh, S., and Bui, H.., Using Multiple Windows to Track Concept Drift. In Intelligent Data Analysis Journal, vol. 8(1), 2004.

Papadimitriou, S., Brockwell, A. and Faloutsos, C., Adaptive, hands-off stream mining. In VLDB, pp. 560-571, 2003.

Zhu, Y. and Shasha, D.. Statstream: Statistical monitoring of thousands of data streams in real time. In VLDB, 2002.

* cited by examiner

CHAOTIC, THRESH = 60, COMPRESSION = 63.5742%

PERIODOGRAM

CHAOTIC, THRESH = 100, COMPRESSION = 80.957%

PERIODOGRAM

CHAOTIC, THRESH = 120, COMPRESSION = 86.0352%

PERIODOGRAM

RESOURCE ADAPTIVE SPECTRUM ESTIMATION OF STREAMING DATA

CROSS REFERENCE TO RELATED APPLICATIONS

This application is a continuation application of U.S. patent application Ser. No. 11/389,344 filed on Mar. 24, 2006 now U.S. Pat. No. 8,112,247, the contents of which are hereby fully incorporated by reference in its entirety.

This invention was made with Government support under Contract No.: H98230-05-3-0001 awarded by the U.S. Department of Defense. The Government has certain rights in this invention.

FIELD OF THE INVENTION

The present invention relates to spectrum or periodogram estimation in streaming data under conditions of limited resources.

BACKGROUND OF THE INVENTION

Numerals presented herebelow in square brackets—[ ]—are keyed to the list of references found towards the close of the present disclosure.

Spectrum estimation, that is, analysis of the frequency content of a signal, is a core operation in numerous applications, such as data compression, medical data analysis (ECG data) [2], pitch detection of musical content [4], and other applications. Widely used estimators of the frequency content are the periodogram and the autocorrelation [5] of a sequence. For statically stored sequences, both methods have an O(nlogn) complexity using the Fast Fourier Transform (FFT). For dynamically updated sequences (streaming case), the same estimators can be computed incrementally, by continuous update of the summation in the FFT computation, through the use of Momentary Fourier Transform [12,9,15].

However, in a high-rate, data streaming environment with multiple processes 'competing' over computational resources, there is no guarantee that each running process will be allotted sufficient processing time to fully complete its operation. Instead to of blocking or abandoning the execution of processing threads that cannot fully complete, a desirable compromise would be for the system to make provisions for adaptive process computation. Under this processing model every analytic unit (e.g., in this case the 'periodogram estimation unit') can provide partial ('coarser') results under tight processing constraints.

Under the aforementioned processing model and given limited processing time, one may not be seeking for results that are accurate or perfect, but only 'good enough'. Even so, since a typical streaming application will require fast, 'on-the-fly' decisions, an intelligent sampling procedure of exemplary efficiency would appear to represent a significant improvement over conventional efforts. A need has thus been recognized in connection with effecting such an improvement, among others.

SUMMARY OF THE INVENTION

There is broadly contemplated herein a method and apparatus for periodogram estimation based on resource (such as CPU, memory etc.) availability, in accordance with at least one presently preferred embodiment of the present invention. Also broadly contemplated herein is an intelligent sampling procedure that can decide whether to retain or discard an examined sample, based on a "lightweight" linear predictor whereby a sample is recorded only if its value cannot be predicted by previously seen sequence values.

Also, considering that in view of the sampling process, the retained data samples (a subset of the examined data window) are not guaranteed to be equi-spaced, there is also contemplated herein an elaboration of a closed-form periodogram estimation in the context of unevenly spaced samples.

In summary, one aspect of the invention provides a method of providing a spectrum estimation for data in a data stream, the method comprising the step of providing a spectrum estimation based on resource availability.

Another aspect of the invention provides an apparatus for providing a spectrum estimation for data in a data stream, the apparatus comprising an arrangement for providing a spectrum estimation based on resource availability.

Furthermore, an additional aspect of the present invention provides a program storage device readable by machine, tangibly embodying a program of instructions executable by the machine to perform method steps for providing a spectrum estimation for data in a data stream, the method comprising the step of providing a spectrum estimation based on resource availability.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE INVENTION

Figure 1:
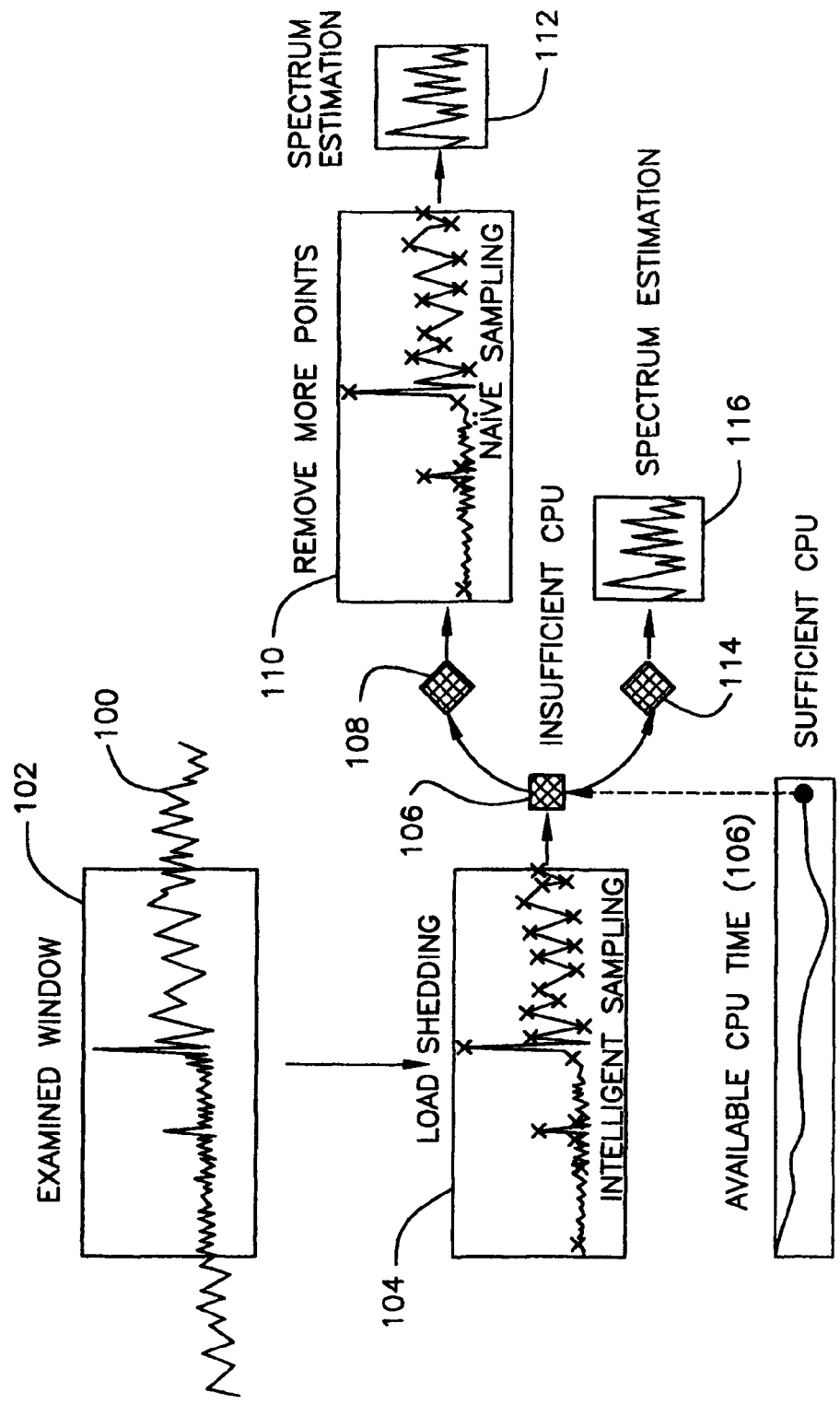
FIG. 1 provides a general visual depiction of a presently inventive methodology.

Generally speaking, in considering a data streaming scenario, one objective addressed herein is the provision of efficient mechanisms for estimating and updating the spectrum within a current data window. As such, a periodogram may be used as an estimate of the spectrum. A schematic illustration of resource-adaptive methodology in accordance with a preferred embodiment of the present invention is provided in FIG. 1. (It should be noted that throughout the present disclosure, the terms "periodicity estimation", "spectrum estimation" and "periodogram estimation" are used interchangeably and are intended to relate to essentially the same phenomenon.)

Briefly, in the context of an examined window 102 of a data stream 100, a load shedding arrangement will provide an intelligent sampling scheme (104). At a decision point 106, if there is insufficient CPU time (108), then more points will be removed (110) to yield a spectrum estimation (112) in that context. But given sufficient CPU time (114), then no intermediate step is essentially needed to arrive at spectrum estimation (116). This process will be described in greater detail below.

Essentially, at any given time, there might not be enough processing capacity to provide a periodogram update using all the samples within the data window. The first step toward tackling this problem is the reduction of points using an 'on-the-fly' load-shedding scheme. Sub-sampling can lead to data aliasing and deteriorate the quality of the estimated periodogram. Therefore, the sampling should not only be fast but also intelligent, mitigating the impact of the sub-sampling on the squared error of the estimated periodogram. Sampling is based on a linear predictor, which retains a sample only if its value cannot be predicted by its neighbors. An estimator unit is also employed, which changes over time the 'elasticity' of the linear predictor, for proper adaptation to the current CPU load.

If there is enough CPU time to process the final number of retained samples, the spectrum is computed. Otherwise, more samples are dropped randomly and the new estimate is computed on the remaining samples.

The computation of the approximate periodogram is based on a formulation of the DFT and the periodogram using unevenly spaced samples, a highly desirable step due to the sampling process. Under a sliding window model, some of the previously used samples are discarded, while new samples are added in the window. A periodicity estimation algorithm proposed herein possesses a very simple update structure, requiring only subtraction of contributions from discarded samples and addition of contributions due to the newly included samples.

Turning now to specific implementations, the Discrete Fourier Transform is used to analyze the frequency content in a discrete and evenly sampled signal. In particular for a discrete time signal $x[n]$ the DFT $X[m]$ is defined for all samples $0 \leq m, n \leq N-1$ as:

$$X[m] = \frac{1}{\sqrt{N}} \sum_{n=0}^{N-1} x[n] e^{-j\frac{2\pi nm}{N}} \quad (1)$$

The periodogram P of a signal corresponds to the energy of its DFT:

$$P[m] = \|X[m]\|^2 \quad (2)$$

Figure 2:
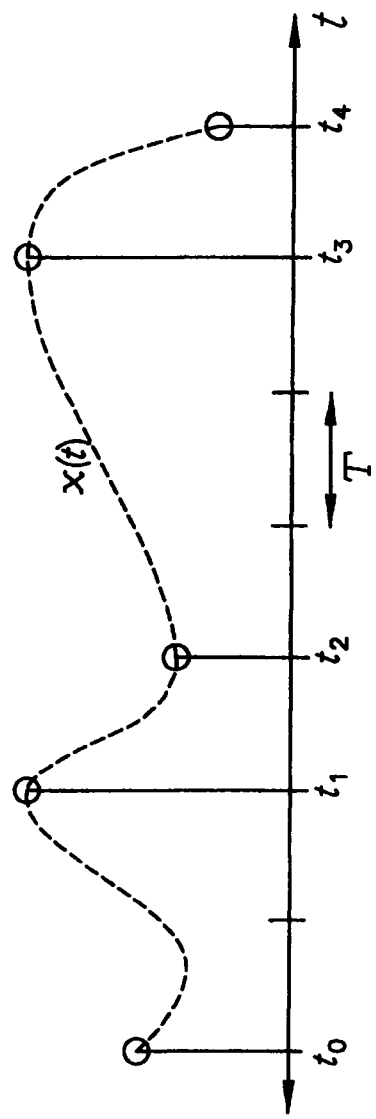
FIG. 2 illustrates an unevenly sampled signal.

Consider now, a continuous signal $x(t)$ sampled unevenly at discrete time instants $\{t_0, t_1, \ldots, t_{N-1}\}$. An example of this is shown in FIG. 2.

One may write this unevenly sampled signal using the discrete notation as $x[k_n]$ where $t_i = k_i T (k_i \in \mathbb{Z}^+)$ and T corresponds to the sampling interval with all sampling instants as multiples. This is also shown in FIG. 2. (Herethroughout there will be described an adaptive load-shedding algorithm that retains unevenly spaced samples and while an incremental DFT estimation is provided for such discrete signals.)

One can measure the complexity of algorithms in terms of the number of additions (subtractions), multiplications and divisions involved in the computations. Thus, one may label the complexity of a single multiplication as $\xi_{Mul}$, of a division as $\xi_{Div}$ and of a sum/subtraction as $\xi_{Sub}$.

In connection with a load shedding scheme, one may consider the typical problem of running spectral analysis where we slide a window across the temporal signal and incrementally update the signal's DFT (and the respective periodogram). Preferably, one starts with an evenly sampled signal, with sampling interval T. Consider that the window slides by a fixed amount Width×T. As a result of this sliding we discard $n_1$ points from the beginning of the signal and add $n_2$ points to the end. However, if the available CPU cycles do not allow us to update the DFT using all the points, one can adaptively prune the set of added points using uneven sub-sampling to meet the CPU constraint while minimizing the impact on the accuracy of the updated DFT.

The disclosure now turns to an algorithm (with linear complexity) for the adaptive pruning of the newly added samples. In order to decide whether one can retain a particular sample, one may preferably determine whether it can be linearly predicted from its neighbors. (Higher order predictors are also possible, but would clearly result in higher complexity.) In particular, to make a decision for sample $k_i$ one preferably compares the interpolated value $x^{int}[k_i]$ with the actual value $x[k_i]$, where the interpolated value is computed as:

$$x^{int}[k_i] = \frac{x[k_{i-1}](k_{i+1} - k_i) + x[k_{i+1}](k_i - k_{i-1})}{k_{i+1} - k_{i-1}} \quad (3)$$

where sample $k_{i-1}$ is the last retained sample before sample $k_i$ and sample $k_{i+1}$ is the immediately following sample. If $$|x^{int}[k_i] - x[k_i]| \leq \frac{\text{Thresh} \times |x[k_i]|}{100}$$

one can discard the sample $k_i$, otherwise it is retained. The parameter Thresh is an adaptive threshold that determines the quality of the approximation. If the threshold is large, more samples are discarded, and similarly if the threshold is small fewer samples are discarded. (It should be noted that the squared approximation error due to this sub-sampling scheme cannot be bounded in general for all signals, however it is selected for its computational simplicity. In particular, for the wide variety of signals considered in experimentation herein, there has not been observed squared error significantly larger than the absolute squared threshold value. Modification of this scheme to guarantee bounds on the approximation error can well be further explored.) An example of this interpolation scheme is shown in FIG. 3.

Figure 3:
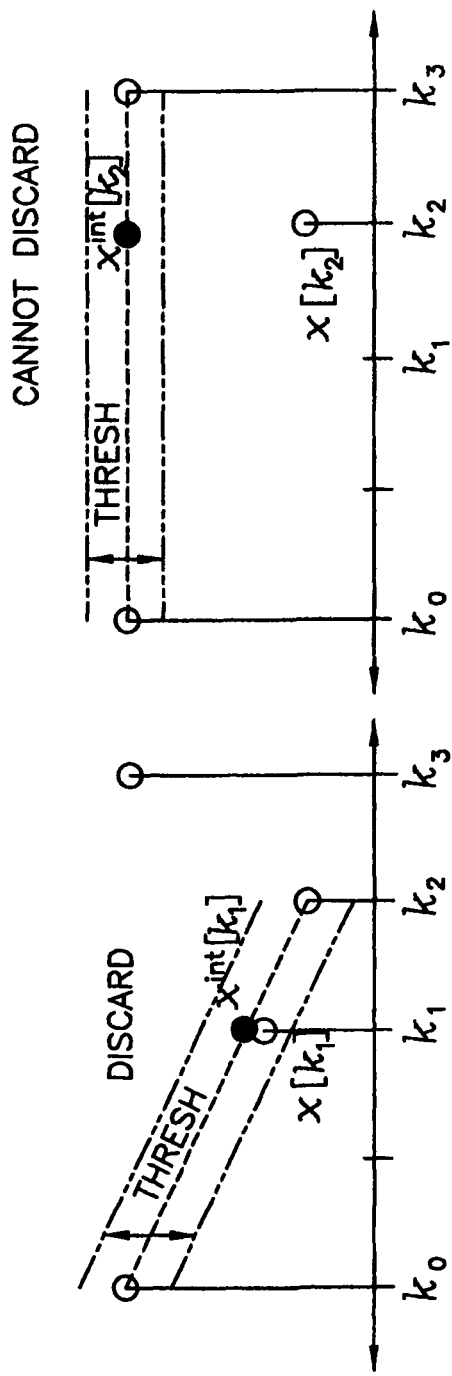
FIG. 3 illustrates a linear interpolation scheme for the adaptive pruning of samples.

In FIG. 3, there are shown two steps of the algorithm. In the first step, a decision is made that we can discard sample $k_i$ as it can be interpolated by samples $k_0$ and $k_2$. In the next step, a decision is made that we cannot discard sample $k_2$, as it cannot be interpolated using samples $k_0$ and $k_3$, its neighbors. If one starts out with $n_2$ samples need to be pruned, the complexity of this algorithm is:

$$\xi^{interp} = (2\xi_{Mul} + 4\xi_{Sub} + \xi_{Div})(n_2 - 2) \quad (4)$$

Further below is a discussion of how to tune the threshold Thresh in order to obtain the desired number of $\hat{n}_2$ samples, out of the $n_2$ samples added by the sliding window.

Figure 4:
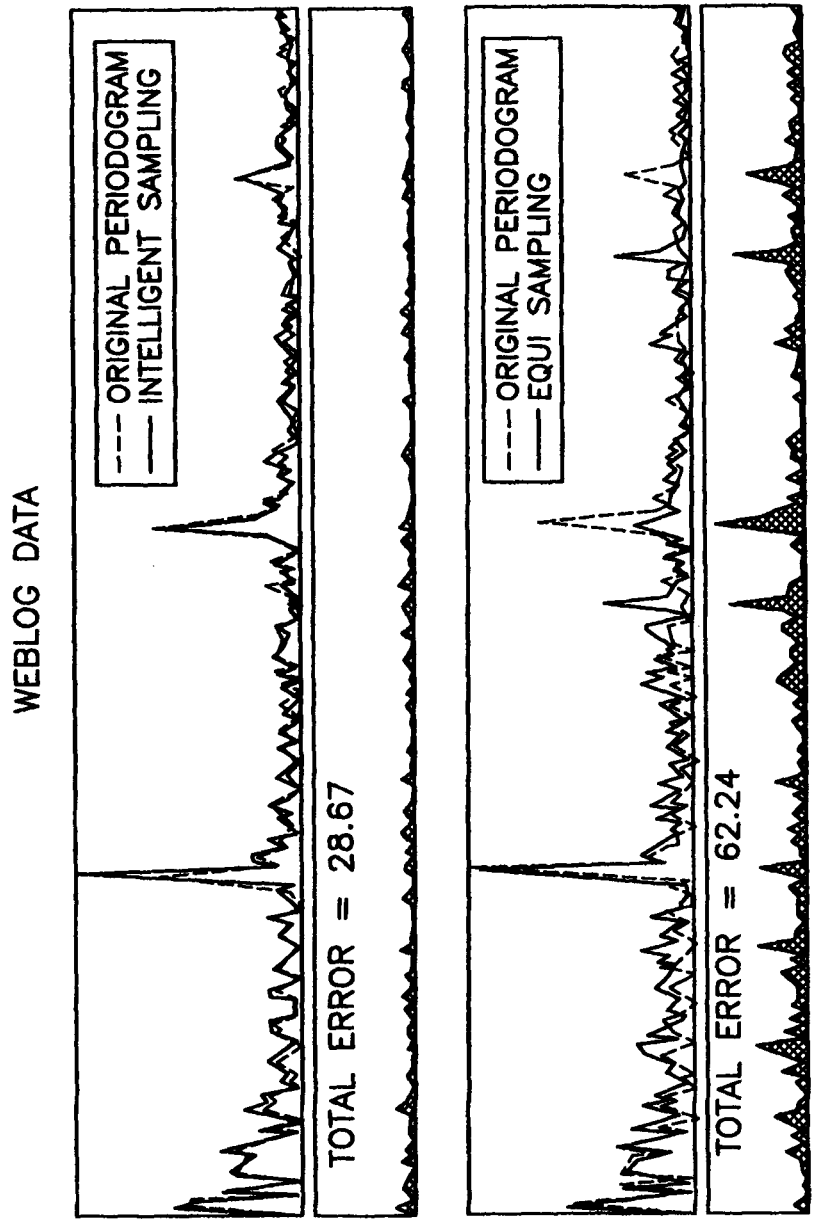
FIG. 4 illustrates a comparison of spectrum estimation errors for intelligent sampling vs. equi-sampling techniques.
Figure 5:
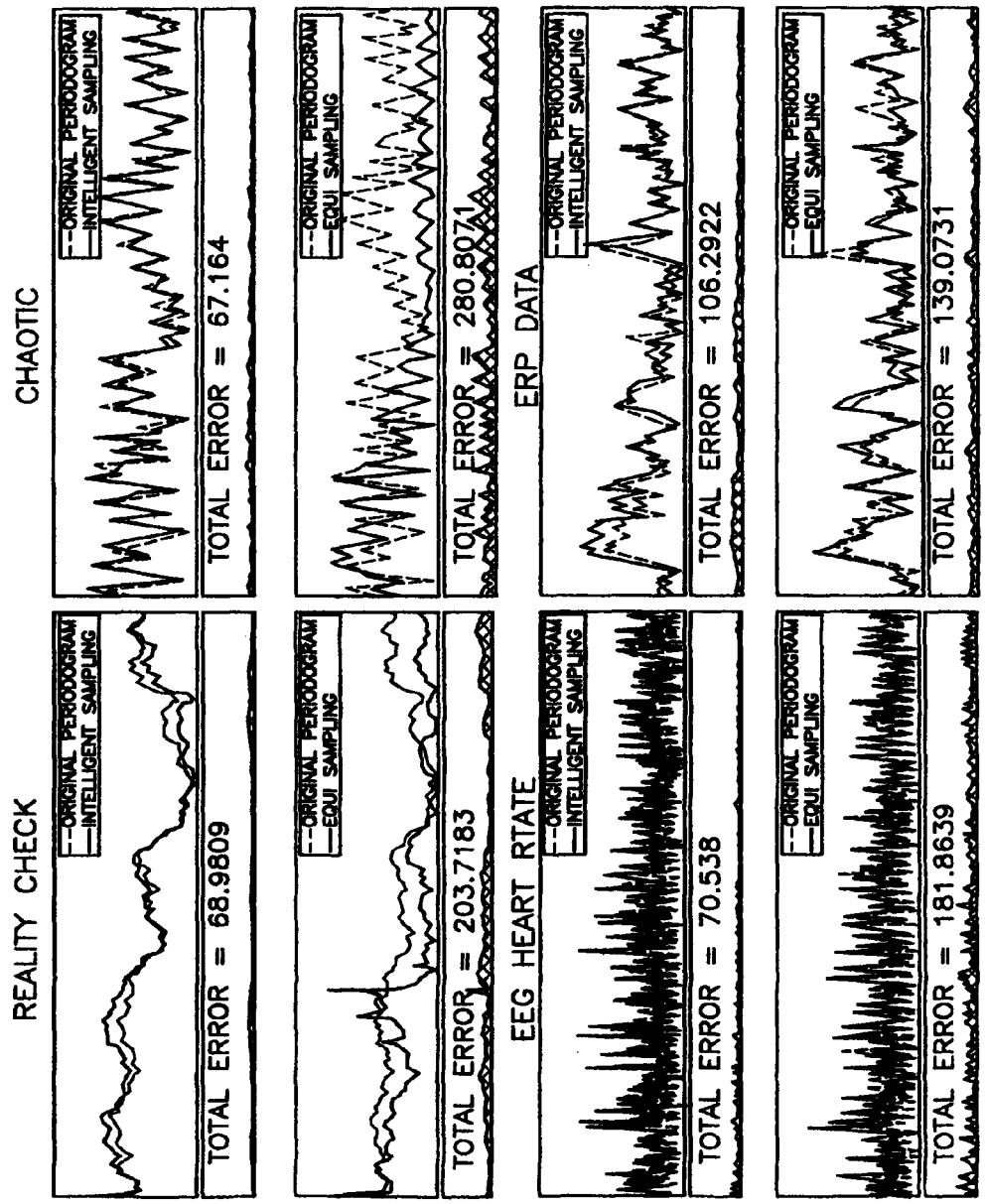
FIG. 5 provides a comparison of estimations for additional datasets.

In FIG. 4, there is illustrated with respect to a stream that measures web usage, a comparison of a presently inventive intelligent sampling method against an equi-sampling technique, which samples data at a specified time interval. Preferably, a presently inventive algorithm is executed for a specific threshold and the data points within a window are reduced from M down to N (unevenly spaced). One preferably estimates the resulting periodogram (see further below) as well the periodogram derived by equi-sampling every N/M points. It is apparent from FIG. 4 that intelligent sampling provides a much higher quality reconstruction of the periodogram, because it can retain important features of the data stream. Additional examples on more datasets are provided in FIG. 5.

Figure 6:
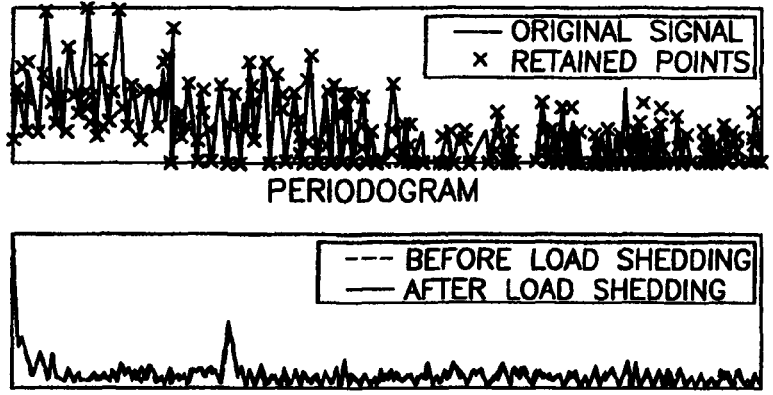
FIG. 6 illustrates spectrum approximation for different threshold values, for weblog data.
Figure 6:
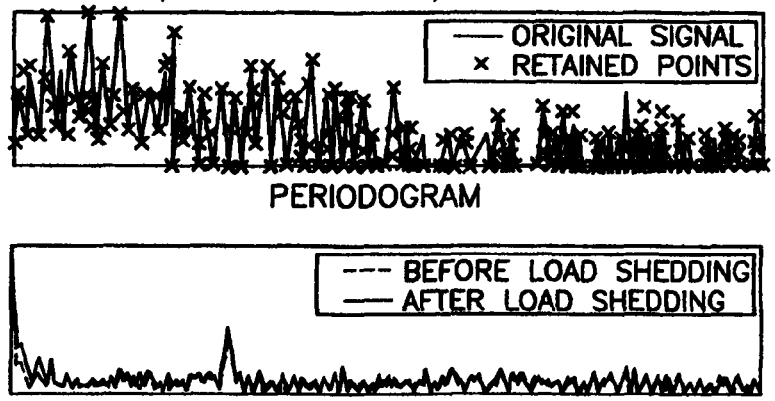
Figure 6:
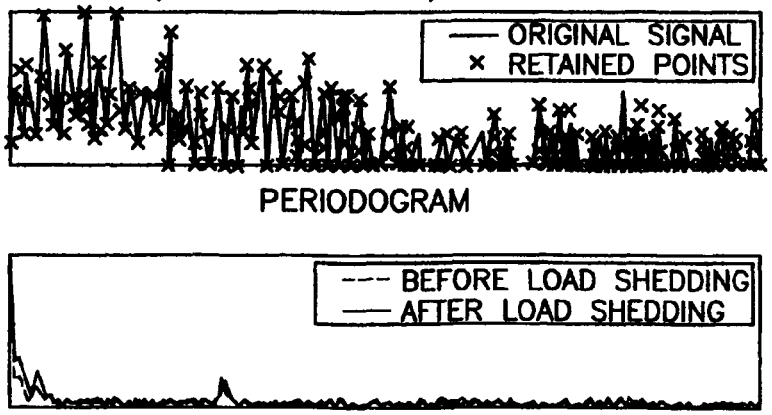
Figure 7:
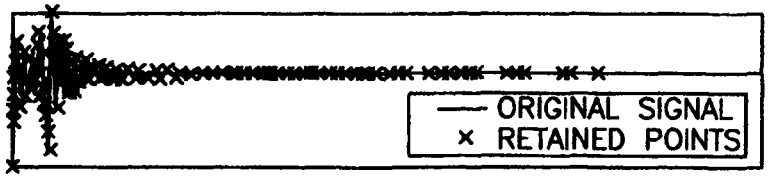
FIG. 7 illustrates spectrum approximation for different threshold values, for chaotic data.
Figure 7:
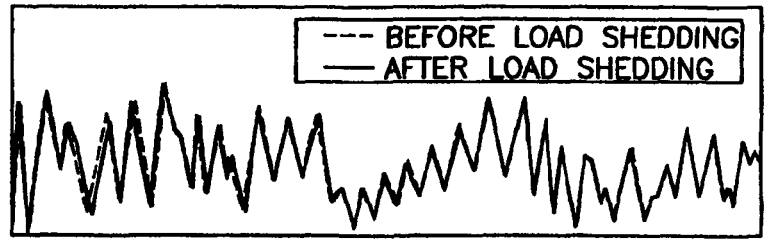
Figure 7:
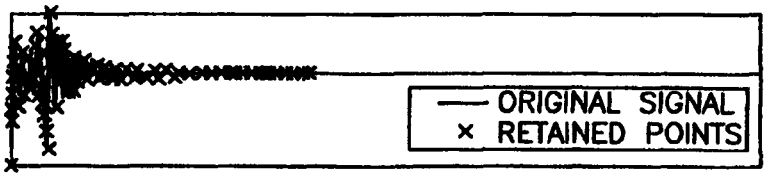
Figure 7:
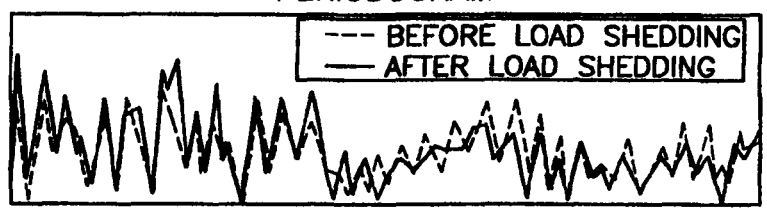
Figure 7:
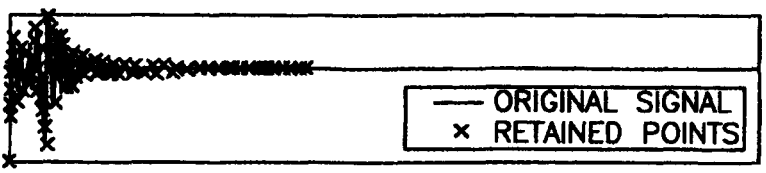
Figure 7:

The load-shedding algorithm assumes the input of a threshold value, which directly affects the resulting number of retained points within the examined window. The desirable number of final points after the thresholding is dictated by the available CPU load. An optimal threshold value would lead to sampling exactly as many points as could be processed by the currently available CPU time. However, there is no way of predicting accurately the correct threshold without having seen the complete data, or without resorting to an expensive processing phase. In FIGS. 6 and 7 there are provided various examples of the spectrum approximation for different parameters of the load-shedding threshold value.

A simple estimator of the threshold value with constant complexity can be provided, derived by training on previously seen portions of the data stream. The expectation is that the training will be performed on a data subset that captures a sufficient variation of the stream characteristics. The estimator will accept as input the desired number of final samples that should remain within the examined window, along with a small subset of the current data characteristics, which—in a way—describe its 'shape' or 'state' (e.g. a subset of the data moments, its fractal dimensionality, etc.). The output of the estimator is a threshold value that will lead (with high expectation) to the desirable number of window samples.

The estimator is not expected to have zero error, but it should lead approximately to the desired compression ratio. In the majority of cases the selected threshold will lead either to higher or lower compression ratio. Intuitively, higher compression (or overestimated threshold) is preferable. This is the case, because then one does not have to resort to the additional phase of dropping randomly some of the retained samples (a sampling that is 'blind' and might discard crucial points, such as important local minima or maxima). In experimentation (as discussed further below), it has been verified that this desirable feature is true for the threshold estimator that is presented immediately below.

By way of a training phase, assume that F is a set of features that capture certain desirable characteristics of the examined data window w, and $P \in \{1, 0, \ldots, |w|\}$ describes how many points can be processed at any given time. The threshold estimator will provide a mapping $F \times P \mapsto T$, where T is a set of threshold values.

It is not difficult to visualize that data whose values change only slightly (or depict small variance of values) do not require a large threshold value. The reverse situation exists for sequences that are 'busy', or exhibit large variance of values. With this observation in mind, there is employed the variance within the examined window as a descriptor of the window state. Higher order moments of the data could also be used in conjunction with the variance for improving the accuracy of the predictor. However, for simplicity and for keeping the computational cost as low as possible, there is employed just the variance in our current prototype implementation.

Figure 8:
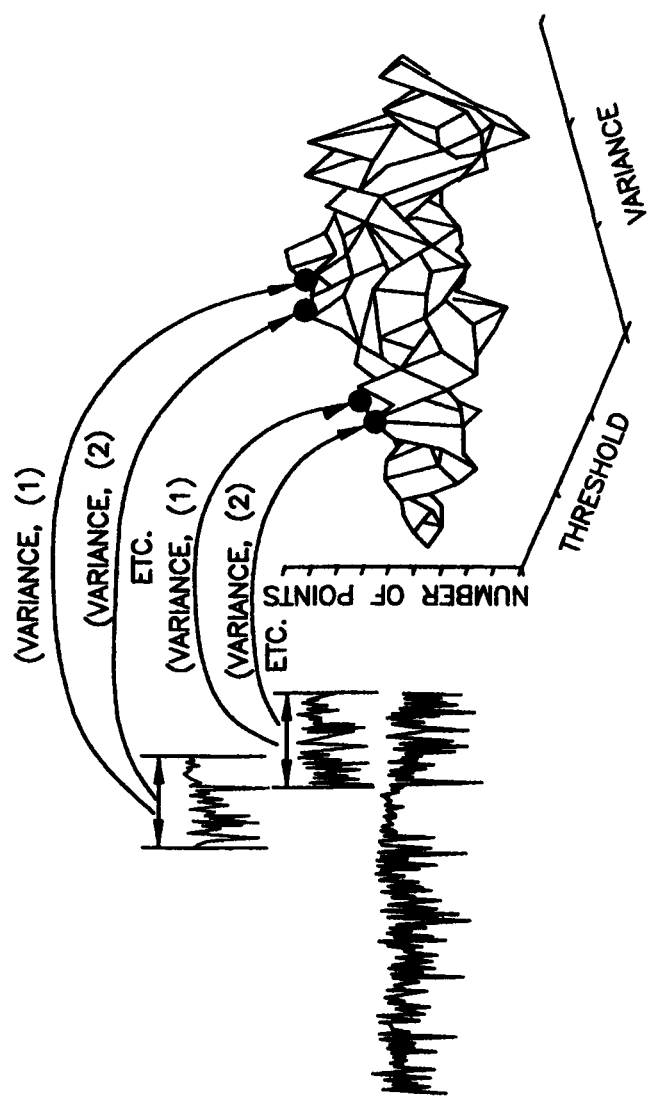
FIG. 8 illustrates a training phase for a threshold estimator.

The training phase proceeds as now described. Given the training data, a sliding window is run on them. For each data window there is computed the variance and there is executed the load-shedding algorithm for different threshold values (typically, 20, 40, . . . , 100, 120). After the algorithm execution the remaining number of data points is recorded. This process is repeated for all the extracted data windows. The result of this algorithm will be a set of triplets: [threshold, variance, number of points]. Given this, one can construct the estimator as a mapping f (numPoints, variance) $\mapsto$ Thresh, where the actual estimator is essentially stored as a 2-dimensional array for constant retrieval time. An example of this mapping is shown in FIG. 8.

It is clear that the training phase is not performed in real-time. However it happens only once (or periodically) and it allows for a very fast prediction step.

It should be pointed out that, even though we assume that the training data will provide 'sufficient' clues on the data stream characteristics, the estimator might come upon an input of [variance, numpoints] that has not encountered during the training phase. In this case, one can simply provide the closest match, e.g. the entry that has the closest distance (in the Euclidean sense) to the given variance and number of points. Alternatively, one could provide an extrapolation of the values, in other words, explicitly learn the mapping function. This can be achieved by constructing an RBF network [1] based on the training triplets. Since this approach is significantly more expensive and could present overfitting problems, in the experiments below the former alternative is followed.

Further, over a period of time, the stream characteristics may gradually change, and in the end may differ completely from the training data, hence leading to inconsistent predictions. One can compensate for this by 'readjusting' the predictor, by also recording the observed threshold error during the algorithm execution. This will result in a more extended maintenance phase of the estimator, but this cost is bound to pay off in the long run for datasets that exhibit frequent 'concept drifts' [10, 7]. This extension is not further elucidated upon herein, but it is presently noted as a potential addition for a more complex version of the threshold estimator.

Consider a signal $x[k_i]$, $0 \leq i \leq N-1$, as shown in FIG. 2. Since the DFT is defined only for evenly sampled signals, there is implicitly recreated an evenly sampled signal before computing the DFT. For this, there is again used a linear interpolator (that matches the sub-sampling algorithm), thereby reconstructing a piece-wise linear evenly sampled signal. The DFT of this evenly sampled signal may be computed in terms of the sum of contributions of each of the individual line segments that constitute it. Due to the nature of the linear interpolator the contribution of each line segment to the DFT may be analytically derived in terms of only the endpoints of the segment (i.e. samples in the original unevenly sampled signal) and the distance between them. This means that one does not actually need to interpolate the unevenly sampled signal but can derive a closed form expression for the DFT under the assumption of a linear interpolation scheme. (Similar approaches have also been followed in [2].) Note that while the time domain signal includes only N (uneven) samples, in order to compute the Discrete Fourier Transform (DFT) of this signal, one will preferably sample the DFT at least $M = k_{N-1} - k_0$ times to avoid time domain aliasing. If we denote by $X_n[m]$ the contributions to the Fourier Transform from each of the N−1 line segments that make up the implicitly recreated evenly sampled signal, then the DFT of the whole signal can be written as:

$$X[m] = \sum_{n=1}^{N-1} X_{n[m]} \quad (5)$$

where for m=1, ..., M−1

$$X_n[m] = \frac{1}{(k_n - k_{n-1})\left(\frac{2\pi m}{M}\right)^2} \left[ \begin{array}{l} (x[k_{n-1}] - x[k_n])\left(e^{-j\frac{2\pi m k_{n-1}}{M}} - e^{-j\frac{2\pi m k_n}{M}}\right) + \\ j\frac{2\pi m}{M}\left(x[k_n]e^{-j\frac{2\pi m k_n}{M}} - x[k_{n-1}]e^{-j\frac{2\pi m k_{n-1}}{M}}\right) \end{array} \right] \quad (6)$$

and for m=0

$$X_n[0] = \frac{1}{2}(x[k_{n-1}] + x[k_n])(k_n - k_{n-1}) \quad (7)$$

A significant benefit that equation (5) brings is that the DFT for such unevenly sampled signals can be evaluated incrementally. Hence, if the window is shifted by a fixed width such that the first $n_1$ points are discarded, and $n_2$ points are added at the end, then the DFT of the signal may be updated as follows:

$$X^{new}[m] = X^{old}[m] - \sum_{n=1}^{n_1} X_n[m] + \sum_{n=N}^{N+n_2-1} X_n[m] \quad (8)$$

There will now be considered the complexity of computing this update. As with several papers that analyze the complexity of the FFT, it is assumed that the complex exponentials $$e^{\frac{j2\pi m k_n}{M}}$$

(and the intermediate value $$\frac{2\pi m k_n}{M})$$

are considered pre-computed for all m and n. Using labels for complexity as defined in the notation, the complexity of computing one single update coefficient $X_n[m]$ for m=1, ..., M−1−1 may be represented as:

$$\hat{\xi} = 6\xi_{Mul} + 5\xi_{Sub} + \xi_{Div} \quad (9)$$

and for m=0 as $$\hat{\xi} = 2\xi_{Mul} + 2\xi_{Sub} \quad (10)$$

Finally, the complexity of updating all the M DFT coefficients in this scenario is:

$$\xi^{update}(M,n_1,n_2) = (n_1+n_2)[(M-1)(6\xi_{Mul}+5\xi_{Sub}+\xi_{Div})+ (2\xi_{Mul}+2\xi_{Sub})+M\xi_{Sub}]+2M\xi_{Sub}$$

Using a presently inventive sub-sampling algorithm, one can reduce the number of samples that need to be used to update the DFT. Consider that as a result of the pruning, one can reduce $n_2$ samples into a set of $\hat{n}_2$ samples ($\hat{n}_2 \leq n_2$). While the reduction in the number of samples directly translates to a reduction in the complexity of the update, one should also factor in the additional cost of the sub-sampling algorithm. Comparing equations (11) and (4) it is apparent that the overall complexity of the update (including the sub-sampling) is reduced when:

$$\xi^{update}(M,n_1,n_2) \geq \xi^{update}(M,n_1,\hat{n}_2) + \xi^{interp} \quad (12)$$

To determine when this happens, consider a simple case when $\hat{n}_2 = n_2 - 1$, i.e. the sub-sampling leads to a reduction of one sample. The increase in complexity for the sub-sampling is $(2\xi_{Mul}+4\xi_{Sub}+\xi_{Div})(n_2-2)$ while the corresponding decrease in the update complexity is $(M-1)(6\xi_{Mul}+5\xi_{Sub}+\xi_{Div})+(2\xi_{Mul}+2\xi_{Sub})+M\xi_{Sub}$ (from equation (11). Clearly, since $\hat{n}_2 < n_2 \leq M$, one can easily realize that the reduction in complexity far outweighs the increase due to the sub-sampling algorithm. In general, equation (12) is always true when the sub-sampling algorithm reduces the number of samples (i.e., when $\hat{n}_2 < n_2$).

If, at a certain time, the CPU is busy, thereby imposing a computation constraint of $\xi^{limit}$, one should preferably perform a DFT update within this constraint. If $\xi^{update}(M,n_1,n_2) > \xi_{limit}$ one cannot use all the samples $n_2$ for the update, and hence one needs to determine the optimal number of samples to retain $\hat{n}_2$, such that $\xi^{update}(M,n_1,\hat{n}_2)+\xi^{interp} \leq \xi^{limit}$. Specifically, one may compute this as:

$$\hat{n}_2 \leq \frac{\xi^{limit} - \xi^{interp} - 2M\xi_{Sub}}{(M-1)(6\xi_{Mul}+5\xi_{Sub}+\xi_{Div}) + (2\xi_{Mul}+2\xi_{Sub}) + M\xi_{Sub}} - n_1 \quad (13)$$

Finally, one can achieve this by tuning the sub-sampling threshold Thresh based on the threshold estimator algorithm described hereinabove.

The disclosure now turns to experimentation with the algorithms and concepts discussed hereinabove.

The usefulness of the presently inventive resource-adaptive periodicity estimation depends on two factors:
(1) The accuracy of the approach, which is indicated by the quality of the DFT approximation and its respective periodogram. If the periodogram after the load-shedding closely resembles the original one, then the provided estimate is meaningful.
(2) The adaptiveness of the proposed methodology, which is highly dependent on the quality of the threshold estimator. An accurate estimator will lead to sampling rates that closely adapt to the current CPU loads.

The above two factors are examined separately herebelow.

The quality of the approximated Fourier coefficients is measured on a variety of periodic datasets obtained from the time-series archive at UC Riverside [14]. These datasets only have a length of 1024, therefore it is difficult to provide a meaningful evaluation on the streaming version of the algorithm. However, by providing the whole sequence as input to the periodicity estimation unit one can evaluate the effectiveness of the load-shedding scheme in conjunction with the closed-form DFT computation on the unevenly spaced samples. One can compute the accuracy by comparing the estimated periodogram against the actual one (had we not discarded any point from the examined data window). Thus, the above experiment was run on different threshold values Thresh=20 . . . 120. For example, a value of Thresh=20 signifies that the predicted value (using the linear predictor) does not differ more than 20% from the actual sequence value.

Note that the original periodogram is evaluated on a window of M points (M=1024), while the one based on uneven sampling uses only the N remaining samples (N≦M). In order to provide a meaningful comparison between them the latter periodogram is evaluated on all M/2 frequencies—see equation (6)—, even though this is not necessary with an actual deployment of the algorithm.

The accuracy of the presently inventive methodology is compared against a naive approach that uses equi-sampling every N/M points (i.e., leading again to N remaining points within the examined window). This approach is bound to introduce aliasing and distort more the original periodogram, because (unlike the intelligent loadshedding) it does not adapt according to the signal characteristics.

Figure 9:
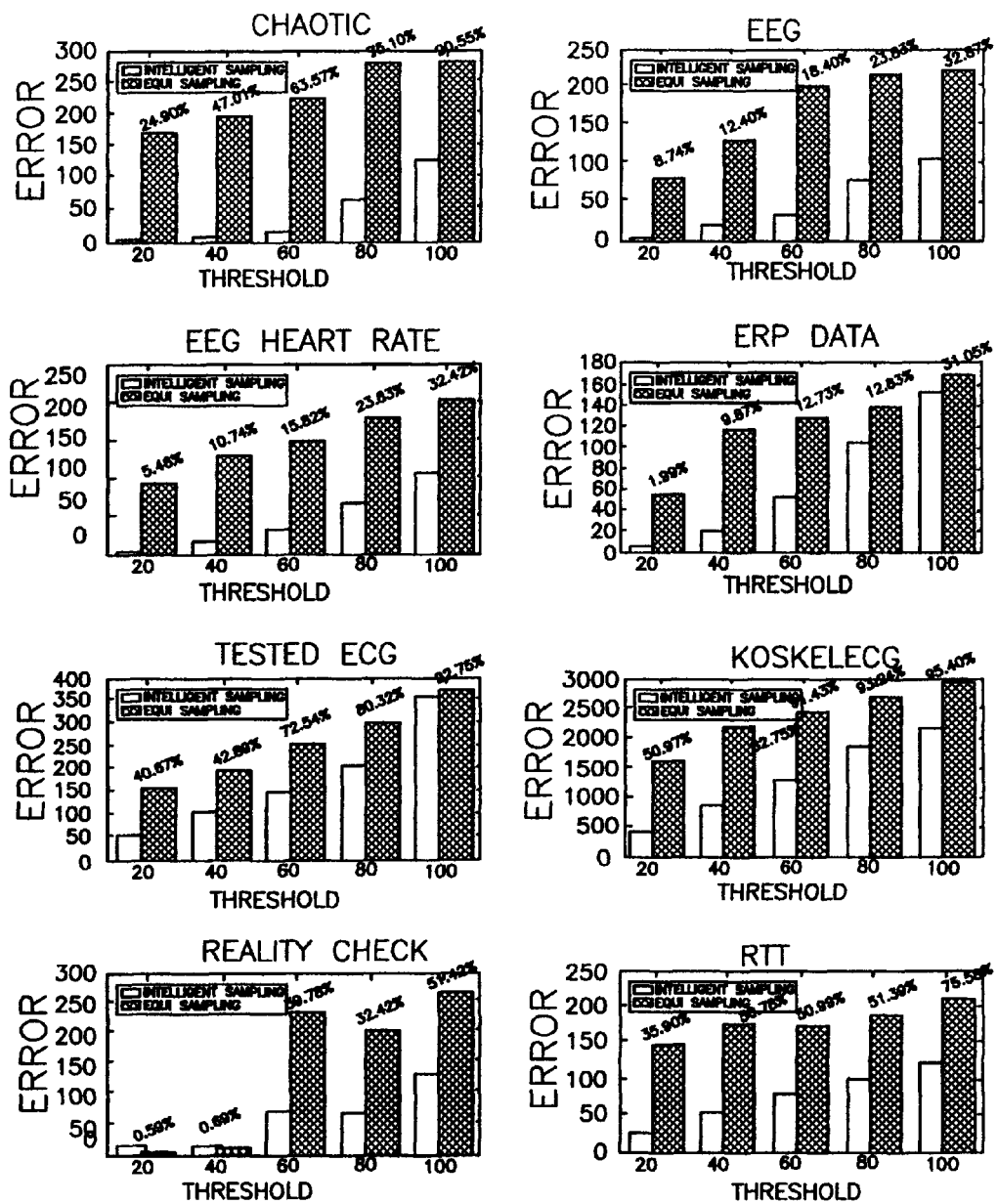
FIG. 9 provides a comparison of spectrum estimations for different compression rates.
Figure 10:
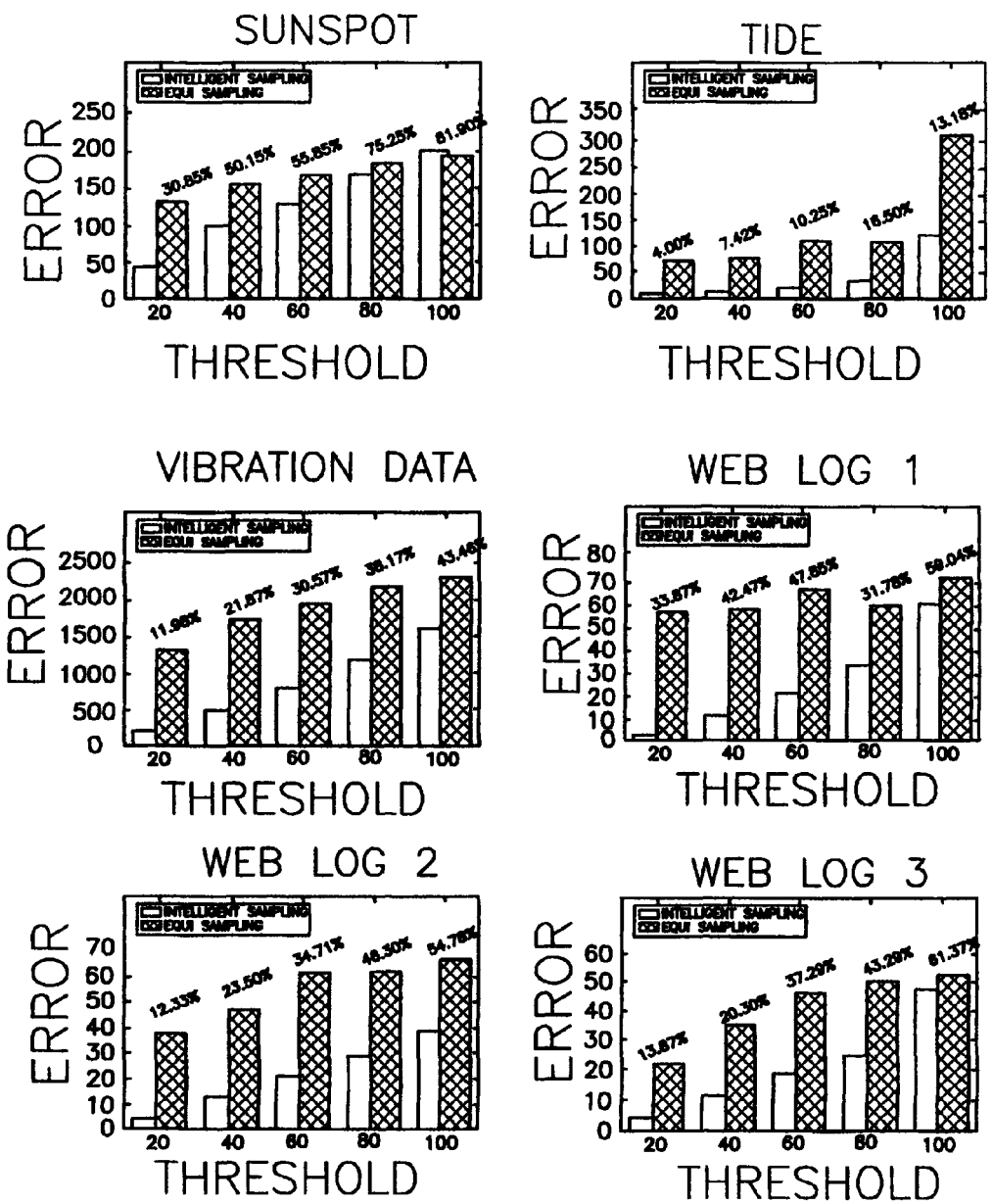
FIG. 10 provides a comparison of sampling techniques for different compression rates.

FIGS. 9 and 10 indicate the periodogram error introduced by the intelligent and the equi-sampling techniques. On top of each bar there is also portrayed the compression achieved using the specific threshold Thresh, computed as 100*(1−N/1024).

The results suggest that the load-shedding scheme employed by the presently inventive technique can lead to spectrum estimates of much higher quality than competing methods. In two cases (FIG. 9, Reality Check) the equi-sampling performs better than the linear interpolator, but this occurs only for minute compression ratios (i.e., when the threshold discards less than 10 samples per 1024 points). In general the observed reduction in the estimation error compared to equi-sampling, can range from 10% to more than 90% on the 14 datasets examined herein.

To test the accuracy of the threshold estimator, longer datasets are needed, which could be used for simulating a sliding window model execution and additionally provide a training subset. Thus, for experimentation purposes, there were utilized real datasets provided by the automotive industry. As such, these are diagnostic measurements that monitor the evolution of variables of interest during the operation of a vehicle. Examples of such measurements could be the engine pressure, the torque, vibration patterns, instantaneous fuel economy, engine load at current speed, etc.

Periodic analysis is an indispensable tool in automotive industry, because predictive maintenance can be possible by monitoring the changes in the spectrum of the various rotating parts. Therefore, a change in the periodic structure of the various engine measurements can be a good indicator of machine wear and/or of an incipient failure.

Figure 11:
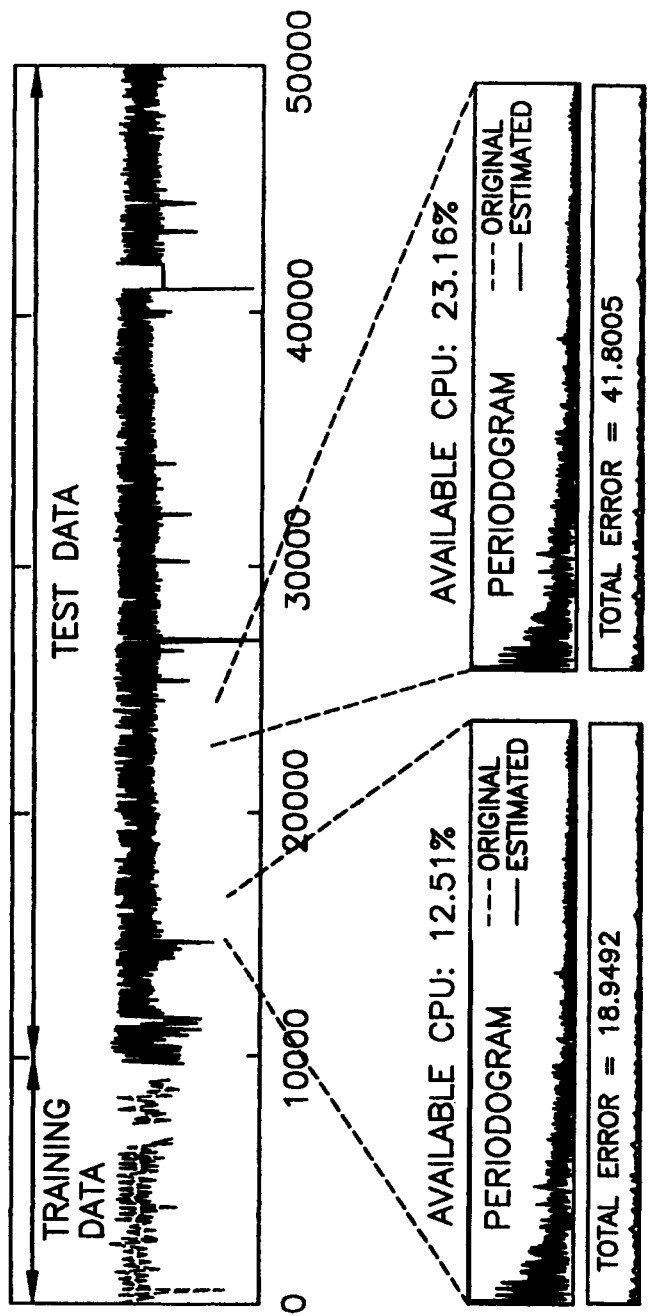
FIG. 11 illustrates experimental results for a presently inventive algorithm as applied to streaming automotive measurements.

The measurements used have a length of 50000 points and represent the monitoring of a variable over an extended period of time. On this data, there was employed a sliding window of 1024 points. A synthetic CPU load is generated, which is provided as input to the periodicity estimation unit. Based on the synthetic CPU trace, at any given point in time the periodicity unit is given adequate time for processing a set of points with cardinality within the range of 50 to 1024 (1024 being the length of the window). In FIG. 11 there are depicted two instances of the approximated spectrum under limited CPU resources. On the first instance the indicated available CPU of 12.41% means that only 12.41% of the total window points should remain after the load-shedding, given the available processing time.

Executing the presently inventive algorithm on the complete data stream, the accuracy of the threshold estimator is monitored. The estimator is fed with the current CPU load and provides a threshold estimate $Thresh_{est}$ that will lead with high probability to $\hat{P}$ remaining points (so that they could be sufficiently processed given the available CPU load). Suppose that the actual remaining points after the application of the threshold $Thresh_{est}$ are P. An indicator of the estimator accuracy is provided by contrasting the estimated number of points $\hat{P}$ against the actual remaining ones P(error=$|\hat{P}-P|$).

The experimental results are very encouraging and indicate an average error on the estimated number of points in the range of 5% of the data window. For this experiment, if the predicted number of points for a certain threshold is 250 points, the actual value of remaining points could be (for example) 200 points. This is the case of an overestimated threshold which compressed more the flowing data stream. As mentioned before, this case is more desirable (than an underestimated threshold), because no additional points need to be subsequently dropped from the current data window (which is not bound to introduce additional aliasing problems).

Figure 12:
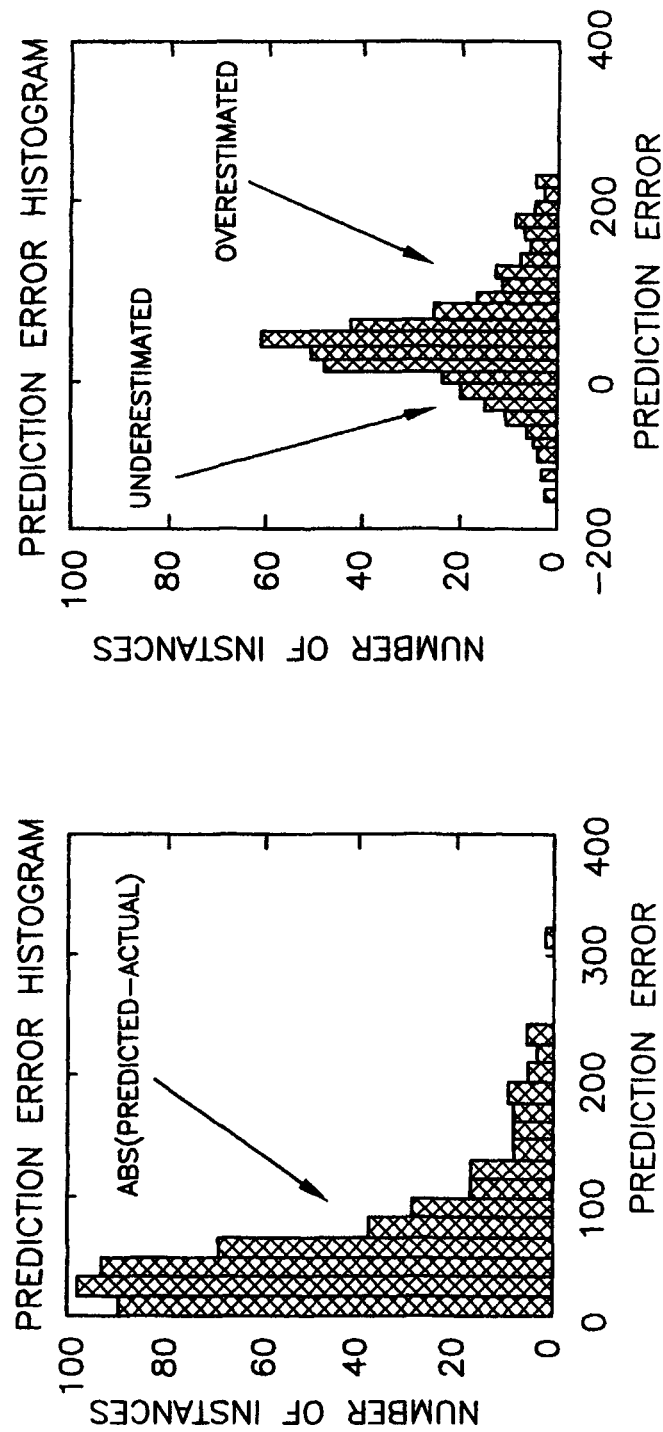
FIG. 12 provides comparative prediction error histograms.

A histogram of the estimator approximation error is given on the left part of FIG. 12. It is observed that for the majority of data windows the estimation error is small, while fewer instances of the algorithm execution report a large error in the threshold estimation. On the right part of FIG. 12 there is an indication of how many cases of overestimated thresholds there are and how many are underestimated. The overestimated ones (more desirable) are higher than the underestimated, which again indicates many of the attractive properties of the proposed threshold predictor.

In summary, there, has been presented herein the first resource-adaptive method for periodicity estimation for streaming data. By way of brief, albeit non-restrictive recapitulation, some key aspects of a proposed method in accordance with at least one embodiment of the present invention are:

(1) An intelligent load-shedding scheme that can adapt to the CPU load using a lightweight predictor.

(2) A DFT estimation that utilizes unevenly spaced samples, provided by the previous phase.

The quality of the approximated DFT has been shown and it has also been demonstrated that the scheme can adapt closely to the available CPU resources. The intelligent load-shedding scheme has been compared against equi-sampling and improvements in the periodogram estimation ranging from 10% to 90% are shown.

Further exploration could involve an examination of whether it is possible to reduce the computational cost even further.

By way of further recapitulation, some of the important contributions set forth herein are as follows:

An abstraction of the resource adaptation problem for periodicity estimation is provided.

An intelligent load-shedding scheme along with a parameter estimator unit that tunes the adaptation to the current CPU load is proposed.

A closed-form Fourier approximation is presented using unevenly spaced samples and it is shown how to update it incrementally.

The performance of a presently inventive approach is analyzed under CPU constraints, and the complexity is measured abstractly, in terms of the number of multiplications, additions and divisions involved (making the analysis independent of the underlying processor architecture). Even though the model is very spartan in its memory utilization, no memory constraints are explicitly imposed. However, the inclusion of potential memory constraints (and other resource constraints) would be a straightforward addition to the model.

Other recent work on periodicity estimation on data streams has appeared in [6], where the authors study sampling techniques for period estimation using sublinear space. [8] proposes sampling methods for retaining (with a given approximation error) the most significant Fourier coefficients. In [11] Papadimitriou, et al., adapt the use of wavelet coefficients for modeling a data stream, providing also a periodicity estimator using logarithmic space complexity. However, none of these approaches addresses the issue of resource adaptation, which is one of the main contributions provided herein. It should be further noted that a presently proposed method for periodogram reconstruction based on irregularly spaced samples is significantly more lightweight than the widely used Lomb periodogram [13] (which incurs a very high computational burden).

It is to be understood that the present invention, in accordance with at least one presently preferred embodiment, includes an arrangement for providing a spectrum estimation based on resource availability, which may be implemented on at least one general-purpose computer running suitable software programs. It may also be implemented on at least one integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

References

1. D. Broomhead and D. Lowe. Multivariate functional interpolation and adaptive networks. In Complex Systems, 2: 321:355, 1988.

2. P. Castiglioni, M. Rienzo, and H. Yosh. A Computationally Efficient Algorithm for Online Spectral Analysis of Beat-to-Beat Signals. In Computers in Cardiology: 29, 417:420, 2002.

3. J. W. Cooley and J. W. Tukey. An algorithm for the machine calculation of complex Fourier series. In Math. Comput. 19, 297:301, 1965.

4. P. Cuadra, A. Master, and C. Sapp. Efficient Pitch Detection Techniques for Interactive Music. In International Computer Music Conference, 2001.

5. M. G. Elfeky, W. G. Aref, and A. K. Elmagarmid. Using Convolution to Mine Obscure Periodic Patterns in One Pass. In EDBT, 2004.

6. F. Erg un, S. Muthukrishnan, and S. C. Sahinalp. Sublinear methods for detecting periodic trends in data streams. In LATIN, 2004.

7. W. Fan. StreamMiner: A Classifier Ensemble-based Engine to Mine Concept-drifting Data Streams. In Proc. of VLDB, pages 1257-1260, 2004.

8. A. C. Gilbert, S. Guha, P. Indyk, S. Muthukrishnan, and M. Strauss. Near-optimal Sparse Fourier Representations via Sampling. In STOC, pages 152-161, 2002.

9. M. Kontaki and A. Papadopoulos. Efficient similarity search in streaming time sequences. In SSDBM, 2004.

10. M. Lazarescu, S. Venkatesh, and H. H. Bui. Using Multiple Windows to Track Concept Drift. In Intelligent Data Analysis Journal, Vol 8(1), 2004.

11. S. Papadimitriou, A. Brockwell, and C. Faloutsos. Awsom: Adaptive, hands-off stream mining. In VLDB, pages 560-571, 2003.

12. A. Papoulis. Signal Analysis. McGraw-Hill, 1977.

13. W. H. Press, B. P. Flannery, S. A. Teukolsky, and W. T. Vetterling. Numerical Recipes: The Art of Scientific Computing. Cambridge University Press, 1992.

14. Time-Series Data Mining Archive. [http://]www.cs.ucr.edu/eamonn/TSDMA/.

15. Y. Zhu and D. Shasha. Statstream: Statistical monitoring of thousands of data streams in real time. In VLDB, 2002.

The invention claimed is:

1. A method of providing a spectrum estimation for data in a data stream, said method comprising the step, executed by a processor, of providing a spectrum estimation based on computer resource availability;
   said step of providing a spectrum estimation comprising:
      accepting a data stream from a source having at least one limitation associated with computer resource availability; and
      sampling data from the data stream;
      said sampling comprising applying a scheme which selects representative data points relative to the at least one limitation associated with computer resource availability;
      said sampling step comprising sampling data from the data stream within a sliding data window;
      said step of applying a scheme comprising determining whether to retain or discard data being sampled, and further comprising adaptively discarding data samples in concert with the sliding data window.

2. The method according to claim 1, wherein said step of providing a spectrum estimation comprises the step, executed by a processor, of providing a periodogram estimation based on resource availability.

3. The method according to claim 2, wherein:
   said step of providing a periodogram estimation comprises using sampled data based on resource availability.

4. The method according to claim 3, wherein:
   said determining step comprises applying a data predictor, the data predictor prompting retention of a data sample only if the value of a data sample cannot be predicted by previously encountered portions of the data stream; and
   said step of providing a periodogram estimation comprises updating the periodogram based on retained data samples.

5. The method according to claim 4, wherein said determining step comprises a linear predictor prompting retention of a data sample only if the value of a data sample cannot be predicted by neighboring data samples.

6. The method according to claim 5, wherein said changing step comprises changing an elasticity of the linear predictor responsive to a current CPU load.

7. The method according to claim 4, wherein:
   said determining step comprises determining whether sufficient CPU time is available for retaining a given number of data samples; and
   said determining step comprises randomly discarding data samples if sufficient CPU time is unavailable for incorporating a given number of data samples.

8. The method according to claim 4, wherein:
   said step of adaptively discarding comprises determining and employing a variable threshold for governing the discarding of data samples; and said step of determining and employing a variable threshold comprises estimating a threshold value as derived by training on previously encountered portions of the data stream.

9. The method according to claim 4, wherein said updating step comprises updating the periodogram in the context of retained data samples that are unevenly spaced.

10. The method according to claim 1, wherein said step of providing a spectrum estimation comprises providing an estimate of a Discrete Fourier Transform.

11. An apparatus for providing a spectrum estimation for data in a data stream, said apparatus comprising an arrangement for providing, via execution by a processor, a spectrum estimation based on resource availability;

said arrangement for providing a spectrum estimation further comprises:
an arrangement for accepting a data stream from a source having at least one limitation associated with computer resource availability; and
an arrangement for sampling data from the data stream, via applying a scheme which selects representative data points relative to the at least one limitation associated with computer resource availability;
said sampling arrangement comprising:
an arrangement for sampling data from the data stream within a sliding data window; and
an arrangement for determining whether to retain or discard data being sampled, and for adaptively discarding data samples in concert with the sliding data window.

12. The apparatus according to claim 11, wherein said arrangement for providing a spectrum estimation comprises an arrangement for providing a periodogram estimation based on resource availability.

13. The apparatus according to claim 12, wherein:
said arrangement for providing a periodogram estimation is adapted to use sampled data based on resource availability.

14. The apparatus according to claim 13, wherein:
said determining arrangement is adapted to apply a data predictor, the data predictor being adapted to prompt retention of a data sample only if the value of a data sample cannot be predicted by previously encountered portions of the data stream; and
said arrangement for providing a periodogram estimation is adapted to update the periodogram based on retained data samples.

15. The apparatus according to claim 14, wherein the linear predictor is adapted to prompt retention of a data sample only if the value of a data sample cannot be predicted by neighboring data samples.

16. The apparatus according to claim 14, wherein:
said determining arrangement is adapted to determine whether sufficient CPU time is available for retaining a given number of data samples; and
said determining arrangement is adapted to randomly discard data samples if sufficient CPU time is unavailable for incorporating a given number of data samples.

17. The apparatus according to claim 14, wherein:
said determining arrangement is adapted to determine and employ a variable threshold for governing the discarding of data samples; and
said determining arrangement is adapted to estimate a threshold value as derived by training on previously encountered portions of the data stream.

18. The apparatus according to claim 14, wherein said arrangement for providing a periodogram estimation is adapted to update the periodogram in the context of retained data samples that are unevenly spaced.

19. The apparatus according to claim 11, wherein said apparatus is adapted to provide an estimation of a Discrete Fourier Transform.

20. A non-transitory program storage device readable by machine, tangibly embodying a program of instructions executable by the machine to perform method steps for providing a spectrum estimation for data in a data stream, said method comprising the step, executed by a processor, of providing a spectrum estimation based on resource availability;

said step of providing a spectrum estimation comprising:
accepting a data stream from a source having at least one limitation associated with computer resource availability; and
sampling data from the data stream;
said sampling comprising applying a scheme which selects representative data points relative to the at least one limitation associated with computer resource availability;
said sampling step comprising sampling data from the data stream within a sliding data window;
said step of applying a scheme comprising determining whether to retain or discard data being sampled, and further comprising adaptively discarding data samples in concert with the sliding data window.

* * * * *